US011279797B2

(12) United States Patent
Kasemi et al.

(10) Patent No.: US 11,279,797 B2
(45) Date of Patent: Mar. 22, 2022

(54) CURING AGENT FOR LOW-EMISSION EPOXY RESIN COMPOSITIONS

(71) Applicant: SIKA TECHNOLOGY AG, Baar (CH)

(72) Inventors: Edis Kasemi, Zürich (CH); Andreas Kramer, Zürich (CH); Ursula Stadelmann, Zürich (CH); Urs Burckhardt, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 251 days.

(21) Appl. No.: 16/074,224

(22) PCT Filed: Feb. 14, 2017

(86) PCT No.: PCT/EP2017/053317
§ 371 (c)(1),
(2) Date: Jul. 31, 2018

(87) PCT Pub. No.: WO2017/140687
PCT Pub. Date: Aug. 24, 2017

(65) Prior Publication Data
US 2019/0177472 A1   Jun. 13, 2019

(30) Foreign Application Priority Data
Feb. 15, 2016 (EP) ..................... 16155767

(51) Int. Cl.
| *C08G 59/56* | (2006.01) |
| *C08G 59/50* | (2006.01) |
| *C08L 63/00* | (2006.01) |
| *C09D 163/00* | (2006.01) |
| *C08K 5/00* | (2006.01) |
| *C08K 5/17* | (2006.01) |

(52) U.S. Cl.
CPC .............. *C08G 59/56* (2013.01); *C08L 63/00* (2013.01); *C09D 163/00* (2013.01); *C08K 5/0025* (2013.01); *C08K 5/17* (2013.01)

(58) Field of Classification Search
CPC ..... C08G 59/50; C08G 59/5033; C08G 59/56
USPC .................................. 523/427, 428
See application file for complete search history.

(56) References Cited

U.S. PATENT DOCUMENTS

| 3,318,484 | A | | 5/1967 | Modderno |
| 3,648,899 | A | | 3/1972 | Lukesch et al. |
| 4,310,695 | A | | 1/1982 | Dante |
| 4,383,090 | A | | 5/1983 | Slocki et al. |
| 4,399,268 | A | * | 8/1983 | Becker ................ C08G 59/50 528/99 |
| 5,064,121 | A | | 11/1991 | Bolduc |
| 5,270,403 | A | | 12/1993 | Mori |
| 6,262,148 | B1 | | 7/2001 | Cheng et al. |
| 6,465,601 | B1 | * | 10/2002 | Wiesendanger ..... C08G 59/623 528/211 |
| 8,147,964 | B2 | | 4/2012 | Vedage et al. |
| 10,221,344 | B2 | * | 3/2019 | Kasemi ................ C08G 59/64 |
| 10,287,388 | B2 | * | 5/2019 | Kasemi .............. C08G 59/5026 |
| 10,301,423 | B2 | * | 5/2019 | Kasemi .............. C08G 59/5033 |
| 10,584,268 | B2 | * | 3/2020 | Kasemi ................ C08K 5/17 |
| 2008/0188591 | A1 | | 8/2008 | Raymond et al. |
| 2012/0168460 | A1 | | 7/2012 | Tolstykh |
| 2013/0302401 | A1 | | 11/2013 | Ma et al. |
| 2014/0107313 | A1 | | 4/2014 | Burckhardt et al. |
| 2014/0288247 | A1 | | 9/2014 | Burckhardt et al. |
| 2015/0337076 | A1 | | 11/2015 | Kasemi et al. |
| 2017/0183444 | A1 | | 6/2017 | Kasemi et al. |
| 2019/0002628 | A1 | * | 1/2019 | Kasemi .............. C08G 59/245 |
| 2019/0048127 | A1 | * | 2/2019 | Kasemi .............. C08G 59/5033 |

FOREIGN PATENT DOCUMENTS

| CN | 1307557 | A | | 8/2001 | |
| CN | 1374292 | A | * | 10/2002 | ........... C07C 215/34 |
| CN | 101892025 | A | | 11/2010 | |
| DE | 26 51 706 | A1 | | 5/1977 | |
| EP | 1956034 | A1 | | 8/2008 | |
| EP | 2 151 463 | A2 | | 2/2010 | |
| EP | 2151461 | A2 | | 2/2010 | |
| EP | 2151462 | A2 | | 2/2010 | |
| EP | 2 752 403 | A1 | | 7/2014 | |
| JP | S52-108500 | A | | 9/1977 | |
| JP | 03031358 | A | * | 2/1991 | .............. C08L 63/00 |
| JP | H09-163307 | A | | 6/1997 | |
| RU | 2028320 | C1 | | 2/1995 | |
| WO | 8103318 | A1 | | 11/1981 | |

(Continued)

OTHER PUBLICATIONS

Machine translation of CN-1374292-A (no date).*
Machine translation of JP-03031358-A (no date).*
Feb. 27, 2020 Office Action issued in Colombian Patent Application No. NC2018/0009569.
Mar. 23, 2017 International Search Report issued in International Patent Application No. PCT/EP2017/053317.
Aug. 16, 2019 Office Action issued in Chilean Patent Application No. 201802304.
Jun. 15, 2020 Office Action issued in Chinese Patent Application No. 201780011438.1.
Sep. 18, 2015 International Search Report issued in International Patent Application No. PCT/EP2015/068302.
Feb. 14, 2017 International Preliminary Report on Patentability issued in International Patent Application No. PCT/EP2015/068302.

(Continued)

*Primary Examiner* — Michael J Feely
(74) *Attorney, Agent, or Firm* — Oliff PLC

(57) ABSTRACT

A curing agent for epoxy resin compositions containing at least one amine of formula (I) and at least one amine of formula (II). The curing agent is a low-odor, low-viscosity, low-toxicity curing agent and has a low propensity for carbamatization and a high reactivity toward epoxy resins. It enables low-odor and low-emission epoxy resin products which are readily processable and which even at low temperatures and high humidities undergo rapid and problem-free curing to afford high-quality plastics having a high hardness and a regular, non-tacky surface with high gloss.

16 Claims, No Drawings

(56) References Cited

FOREIGN PATENT DOCUMENTS

| WO | 2009/080209 A1 | 7/2009 |
|----|----------------|--------|
| WO | 2013068502 A2  | 5/2013 |
| WO | 2014/186031 A1 | 11/2014 |
| WO | 2015/080252 A1 | 6/2015 |

OTHER PUBLICATIONS

Feb. 16, 2018 Chilean Office Action issued in Patent Application No. 2017000361.
May 11, 2018 Office Action issued in U.S. Appl. No. 15/500,441.
Jun. 19, 2018 Office Action issued in Australian Application No. 2015303289.
Sep. 18, 2018 Office Action issued in Chinese Patent Application No. 201580050994.0.
G. Cignarella et al., "Synthesis and Configuration of trans-1-amino-4-benzyl-2,6-dimethylpiperazine as an Intermediate of Semi-synthetic Rifamycins," Journal of Heterocyclic Chemistry, vol. 11, No. 6, Dec. 1974, pp. 985-989.
Dec. 5, 2018 Office Action Issued in Colombian Patent Application No. NC2017/0001949.
Dec. 6, 2016 International Search Report issued in International Patent Application No. PCT/EP2016/071912.
Mar. 20, 2018 International Preliminary Report on Patentability issued in International Patent Application No. PCT/EP2016/071912.
May 23, 2019 Office Action issued in U.S. Appl. No. 15/752,814.
May 1, 2020 Office Action Issued in U.S. Appl. No. 15/752,814.
Oct. 16, 2020 Office Action Issued in U.S. Appl. No. 15/752,814.
Oct. 4, 2016 International Search Report issued in International Patent Application No. PCT/EP2016/070426.
Mar. 15, 2018 International Preliminary Report on Patentability issued in Application No. PCT/EP2016/070426.
Colombian Office Action issued in Colombian Patent Application No. NC2018/0002861.
May 9, 2019 Office Action issued in U.S. Appl. No. 15/746,911.
Nov. 13, 2019 U.S. Office Action issued U.S. Appl. No. 15/746,911.
Nov. 12, 2019 Office Action issued in Colombian Patent Application No. NC2018/0002861.
Nov. 28, 2019 Office Action issued in Chinese Patent Application No. 201680049966.1.
Jan. 24, 2020 Office Action issued in Russian Patent Application No. 2018101970/04.
Mar. 6, 2020 Office Action issued in Australian Patent Application No. 2016315246.
Feb. 20, 2020 Office Action issued in Brazilian Patent Application No. BR112018002181-4.
Apr. 1, 2020 Office Action issued in Colombian Patent Application No. NC2018/0002861.
Jun. 12, 2020 U.S. Office Action issued U.S. Appl. No. 15/746,911.
Jun. 4, 2020 Office Action issued in Indian Patent Application No. 201817009491.
May 25, 2020 Office Action issued in Brazilian Patent Application No. BR112018009855-8.
Jun. 2, 2020 Office Action issued in Japanese Patent Application No. 2018-508167.
Dec. 16, 2020 Office Action issued in U.S. Appl. No. 15/746,911.
U.S. Appl. No. 15/752,814, filed Feb. 14, 2018.
U.S. Appl. No. 15/746,911, filed Jan. 23, 2018.
U.S. Appl. No. 15/500,441, filed Jan. 30, 2017 issued as U.S. Pat. No. 10,301,423.
Jun. 30, 2021 Office Action issued in U.S. Appl. No. 15/746,911.

\* cited by examiner

CURING AGENT FOR LOW-EMISSION EPOXY RESIN COMPOSITIONS

TECHNICAL FIELD

The invention relates to the field of hardeners for epoxy resins, epoxy resin compositions and the use thereof, especially as coating, covering or paint.

PRIOR ART

Epoxy resin compositions suitable for coating purposes should have minimum viscosity in order that they have good processibility at ambient temperature. In addition, they should cure very quickly and without defects, even under moist, cold conditions, and form an even surface without haze, spots or craters. Finally, the cured coating should have high hardness coupled with low brittleness in order to withstand mechanical stress as well as possible. For visually demanding applications, for example top coverings of floors, a coating should also have a high level of gloss and low tendency to yellow under the influence of light.

In order to achieve these properties, in epoxy resin coatings according to the prior art, hardeners based on high-viscosity adducts of polyamines with diepoxides or on high-viscosity Mannich bases are typically used. Mannich bases are condensation products of phenols with aldehydes, especially formaldehyde, and polyamines. Also particularly popular are the Mannich bases of cardanol, an alkylphenol mixture obtained from cashewnut shell oil, which are referred to as phenalkamines. Mannich bases have the advantage that they are capable of very rapid reaction with epoxy resins and hence enable epoxy resin products that quickly build up strength and do not become tacky even at low ambient temperatures, for example at 8° C., and hence can be subjected to load even soon after application.

Mannich bases of this kind on their own are too viscous for use in epoxy resin coatings. Their viscosity can be lowered by adding low-molecular amines thereto. However, amines of this kind usually have an intense odor, are highly irritating to the skin and eyes and sensitizing, and lead to an increased level of blushing effects. In addition, it is possible to use thinners such as benzyl alcohol, glycols or alkylphenols. Thinners of this kind improve the processibility and surface quality of the coating by reducing the occurrence of blushing effects. But they are unreactive toward epoxy resins at room temperature and are therefore not incorporated into the resin matrix on curing. However, there is nowadays an increasing desire for low-emission products which, after curing, have a low content of substances releasable by evaporation or diffusion processes. Therefore, thinners of this kind can be used only in a small amount, if at all, for low-emission epoxy resin coatings. In addition, Mannich bases have a tendency to cause yellowing problems, which is often problematic for coating applications. Phenalkamines having a high content of free alkylphenols additionally attain only low final hardness.

U.S. Pat. No. 6,262,148 describes phenalkamines based on cardanol and MXDA and the use thereof as hardener for coatings. The hardeners described have a low tendency to cause blushing effects and rapid curing. However, they have too high a viscosity for good processibility in coating applications without further dilution.

SUMMARY OF THE INVENTION

It is an object of the invention to provide a low-odor, low-toxicity, low-viscosity, rapid hardener for epoxy resins, which enables low-emission products which cure rapidly even at comparatively low temperatures and form high-quality films or bodies having an even, glossy surface and high strength, and which is especially also suitable for coatings, coverings or paints.

This object is achieved by a hardener as described in claim 1. The hardener has a low odor level, low toxicity and low viscosity, has a low tendency to carbamatization and is very reactive toward epoxy resins. It enables epoxy resin products which need little solvent or thinner, if any at all, and are nevertheless surprisingly mobile. Epoxy resin products of this kind are low in odor and emissions, have very good processibility, and show barely any blushing-related defects even under unfavorable curing conditions. They cure rapidly even at low temperatures, for example 8° C., and form high-quality polymers of high hardness with an even, non-tacky surface having high gloss and a low tendency to yellowing. Surprisingly, the hardener enables epoxy resin products having a higher final hardness than a comparative hardener without amine of the formula (II) or with other added amines.

Further aspects of the invention are the subject of further independent claims. Particularly preferred embodiments of the invention are the subject of the dependent claims.

WAYS OF EXECUTING THE INVENTION

The invention provides a hardener for epoxy resins, comprising
at least one amine of the formula (I)

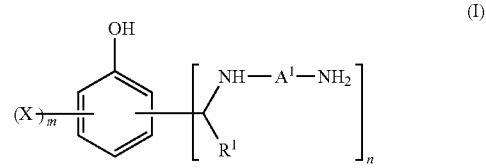

where
$A^1$ is an alkylene radical which has 2 to 15 carbon atoms and optionally has cycloalkyl or aryl rings and optionally contains ether oxygen or amine nitrogen and which is not 1,2-propylene,
$R^1$ is a hydrogen radical or alkyl radical having 1 to 8 carbon atoms or phenyl radical,
X represents identical or different radicals selected from the group consisting of hydroxyl, alkyl, alkenyl and alkoxy each having 1 to 18 carbon atoms and optionally containing ether or hydroxyl oxygen or amine nitrogen,
m is 0 or 1 or 2, and
n is 1 or 2 or 3;
and
at least one amine of the formula (II)

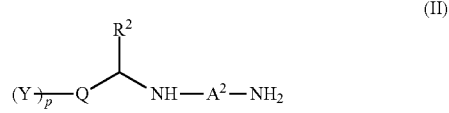

where
$A^2$ is an alkylene radical selected from 1,2-ethylene and 1,2-propylene,
$R^2$ is a hydrogen or methyl or phenyl radical, Q is a five-, six- or seven-membered cycloalkyl or aryl radical optionally having an oxygen, sulfur or nitrogen atom in the ring and having 4 to 7 carbon atoms, Y represents identical or different radicals selected from the group consisting of alkyl, alkoxy and dialkylamino each having 1 to 18 carbon atoms, and p is 0 or 1 or 2 or 3.

Substance names beginning with "poly", such as polyamine, polyol or polyepoxide, refer to substances containing, in a formal sense, two or more of the functional groups that occur in their name per molecule.

A "primary amino group" refers to an amino group which is bonded to a single organic radical and bears two hydrogen atoms; a "secondary amino group" refers to an amino group which is bonded to two organic radicals which may also together be part of a ring and bears one hydrogen atom; and a "tertiary amino group" refers to an amino group which is bonded to three organic radicals, two or three of which may also be part of one or more rings, and does not bear any hydrogen atom.

An "amine hydrogen" refers to the hydrogen atoms of primary and secondary amino groups.

An "amine hydrogen equivalent weight" refers to the mass of an amine or an amine-containing composition that contains one molar equivalent of amine hydrogen.

A "thinner" refers to a substance which is soluble in an epoxy resin and lowers its viscosity, and which is not covalently incorporated into the resin matrix in the curing of the epoxy resin.

"Viscosity" refers to the dynamic viscosity or shear viscosity which is defined by the ratio between the shear stress and the shear rate (speed gradient) and is determined as described in the working examples.

"Molecular weight" refers to the molar mass (in g/mol) of a molecule. "Average molecular weight" is understood to mean the number-average $M_n$ of an oligomeric or polymeric mixture of molecules, which is typically determined by means of gel permeation chromatography (GPC) against polystyrene as standard.

"Room temperature" refers to a temperature of 23° C.

The hardener for epoxy resins comprises at least one amine of the formula (I).

Preferably, $A^1$ represents identical or different radicals selected from the group consisting of 1,2-ethylene, 1,3-propylene, 2-methyl-1,5-pentylene, 1,6-hexylene, 2,2(4),4-trimethyl-1,6-hexylene, 1,3-cyclohexylenebis(methylene), 1,3-phenylenebis(methylene), (1,5,5-trimethylcyclohexan-1-yl)methane-1,3, 3-aza-1,5-pentylene, 3,6-diaza-1,8-octylene, 3,6,9-triaza-1,11-undecylene, 4-aza-1,7-heptylene, 3-aza-1,6-hexylene, 4,7-diaza-1,10-decylene and 7-aza-1,13-tridecylene.

Particularly preferred $A^1$ radicals are 1,3-phenylenebis(methylene), 3-aza-1,5-pentylene or 3,6-diaza-1,8-octylene.

Very particular preference is given to 1,3-phenylenebis(methylene).

Preferably, $R^1$ is a hydrogen radical or an alkyl radical having 1 to 4 carbon atoms, especially methyl, ethyl or isopropyl, or is a phenyl radical.

More preferably, $R^1$ is a hydrogen radical or is a methyl radical.

Most preferably, $R^1$ is a hydrogen radical.

Preferably, X represents identical or different radicals selected from the group consisting of hydroxyl, alkyl, alkenyl and alkoxy each having 1 to 15 carbon atoms and optionally containing ether oxygen, hydroxyl oxygen or amine nitrogen.

More preferably, X is selected from the group consisting of hydroxyl, methyl, methoxy, tert-butyl, nonyl, dodecyl, pentadeca-8-enyl, pentadeca-8,11-dienyl, pentadeca-8,11,14-trienyl, N,N-dimethylaminomethyl, N,N-diethylaminomethyl, N-methyl-N-ethylaminomethyl, N-methyl-N-butylaminomethyl, N,N-bis(hydroxyethyl)aminomethyl, N-methyl-N-hydroxyethylaminomethyl, N-ethyl-N-hydroxyethylaminomethyl, N-butyl-N-hydroxyethylaminomethyl, N-pyrrolidinylmethyl, N-piperidinylmethyl, N-morpholinylmethyl, (3-(N,N-dimethylamino)propyl)aminomethyl or (3-(3-(N,N-dimethylamino)propyl)aminopropyl)aminomethyl, especially pentadeca-8-enyl or pentadeca-8,11-dienyl or pentadeca-8,11,14-trienyl.

Preferably, m is 0 or 1.

In a particularly preferred embodiment, m is 1 and X is pentadeca-8-enyl or pentadeca-8,11-dienyl or pentadeca-8,11,14-trienyl, where the X radical is in the 3 position and the other radicals are in the 2 and/or 4 and/or 6 position based on the phenolic OH.

Such amines of the formula (I) are also referred to as phenalkamines. They are present in commercially available hardeners for epoxy resins, for example Cardolite® NC-540, NC-557, NC-558, NC-566, Lite 2002, GX-6019, GX-6013, NX-4943, NX-5607 or NX-5608 (from Cardolite) or Aradur® 3440, 3441, 3442, 3460 or 3462 (from Huntsman).

In a very particularly preferred amine of the formula (I), m is 1, X is pentadeca-8-enyl or pentadeca-8,11-dienyl or pentadeca-8,11,14-trienyl, $R^1$ is a hydrogen radical and $A^1$ is selected from 1,3-phenylenebis(methylene), 3-aza-1,5-pentylene and 3,6-diaza-1,8-octylene.

The preferred amines of the formula (I) feature particularly good preparability, particularly low viscosity and particularly good properties for the uses described.

A suitable amine of the formula (I) is obtainable from the reaction of at least one primary diamine of the formula (III), at least one aldehyde of the formula (IV) and at least one phenol compound of the formula (V) with elimination of water.

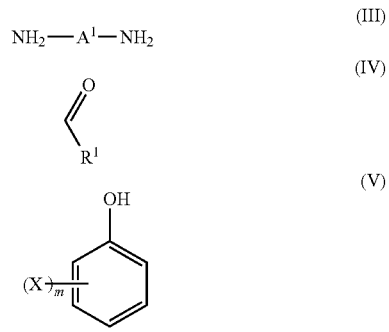

In the formulae (III), (IV) and (V), $A^1$, $R^1$, X and m have the definitions already given.

Preferably, m is 0 or 1, especially 1.

This reaction is a Mannich reaction. The reaction conditions are advantageously chosen such that just one of the two amino groups of the diamine of the formula (III) is alkylated and hence a minimum level of polycyclic compounds is formed.

Such a Mannich reaction gives rise to a reaction product containing mainly amines of the formula (I) substituted in the 2 and/or 4 and/or 6 position in relation to the phenolic OH and having various values for n. Typically, the reaction product further contains a certain proportion of unconverted starting compounds, i.e. diamine of the formula (III) and phenol compound of the formula (V), and additionally a certain proportion of polycyclic Mannich bases from the double or multiple alkylation of diamines of the formula (III).

The diamine of the formula (III) may be used in a molar excess in relation to the phenol compound of the formula (V), preferably in a molar ratio of at least 2/1, especially at least 3/1. In this way, a reaction product containing mainly amines of the formula (I) with n=2 or 3 and having a low content of unreacted phenol compound is obtained.

The diamine of the formula (III) can alternatively be used in a substoichiometric amount in relation to the phenol compound. This affords a comparatively low-viscosity reaction product containing mainly amines of the formula (I) with n=1 and a small amount of unreacted phenol compound. This method is preferred particularly for cardanol as phenol compound, since cardanol is less toxic than other phenol compounds that are typically used, such as phenol, tert-butylphenol or nonylphenol.

The diamine of the formula (III) can also be used in the form of a mixture of two or more diamines of the formula (III), as a result of which the reaction product obtained contains amines of the formula (I) with various $A^1$ radicals.

A suitable aldehyde of the formula (IV) is especially formaldehyde, acetaldehyde, propionaldehyde, isobutyraldehyde, 2-ethylhexanal or benzaldehyde.

Preference is given to formaldehyde.

A suitable primary diamine of the formula (III) is a primary aliphatic diamine having 2 to 15 carbon atoms and optionally having at least one cycloalkyl or aryl ring and optionally containing ether oxygen or amine nitrogen, excluding propylene-1,2-diamine.

Preferably, the primary diamine of the formula (III) is selected from the group consisting of ethylene-1,2-diamine, propylene-1,3-diamine, 2-methylpentane-1,5-diamine, hexane-1,6-diamine, 2,2(4),4-trimethylhexane-1,6-diamine, 1,3-bis(aminomethyl)cyclohexane, 1,3-bis(aminomethyl)benzene, 3-aminomethyl-3,5,5-trimethylcyclohexylamine, diethylenetriamine (DETA), triethylenetetramine (TETA), tetraethylenepentamine (TEPA), dipropylenetriamine (DPTA), 3-(2-aminoethyl)aminopropylamine (N3 amine), N,N'-bis(3-aminopropyl)ethylenediamine (N4 amine) and bis(hexamethylene)triamine (BHMT).

Particular preference is given to 1,3-bis(aminomethyl)benzene, DETA or TETA. Very particular preference is given to 1,3-bis(aminomethyl)benzene.

A suitable phenol compound of the formula (V) is especially phenol, o-cresol, m-cresol, p-cresol, 4-tert-butylphenol, 4-nonylphenol, 4-dodecylphenol, cardanol (consisting mainly of 3-(pentadeca-8-enyl)phenol, 3-(pentadeca-8,11-dienyl)phenol and 3-(pentadeca-8,11,14-trienyl)phenol), 2,3-dimethylphenol (o-xylenol), 2,4-dimethylphenol (m-xylenol), 2,5-dimethylphenol (p-xylenol), 2,6-dimethylphenol, 3,4-dimethylphenol, 3,5-dimethylphenol, 2-methoxyphenol (guaiacol), 3-methoxyphenol, 4-methoxyphenol, 2,6-dimethoxyphenol, catechol, resorcinol, hydroquinone or pyrogallol.

Preference is given to phenol, o-cresol, m-cresol, p-cresol, 4-tert-butylphenol, 4-nonylphenol, 4-dodecylphenol, cardanol, o-xylenol, m-xylenol, p-xylenol, guaiacol, 3-methoxyphenol, 4-methoxyphenol, resorcinol or hydroquinone. Particular preference is given to phenol, o-cresol, m-cresol, p-cresol, cardanol or resorcinol, especially phenol or cardanol.

A very particularly preferred phenol compound of the formula (V) is cardanol. The reaction products obtained therewith are free of phenol or small alkylphenols such as cresol, tert-butylphenol or nonylphenol. They typically have a small content of unconverted cardanol.

Preferred reaction products from the Mannich reaction described especially comprise amines of the formula (I a)

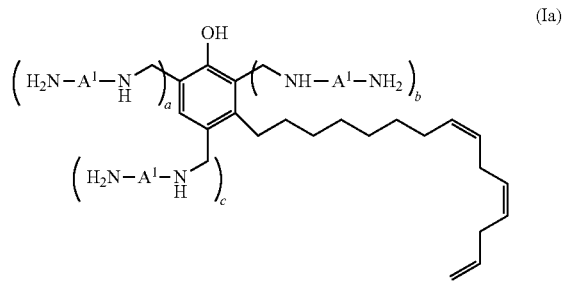

(Ia)

where
a is 0 or 1, b is 0 or 1 and c is 0 or 1, where at least one index a or b or c is 1, and $A^1$ has the definitions already described.

Amines of the formula (I a) are also referred to as phenalkamines.

A preferred amine of the formula (I a) contains, as $A^1$ in each case, a 1,3-phenylenebis(methylene) radical.

A suitable amine of the formula (I) is also obtainable from the reaction of at least one primary diamine of the formula (III) and at least one Mannich base of the formula (VI) with elimination of amine of the formula $R^3$—NH—$R^4$.

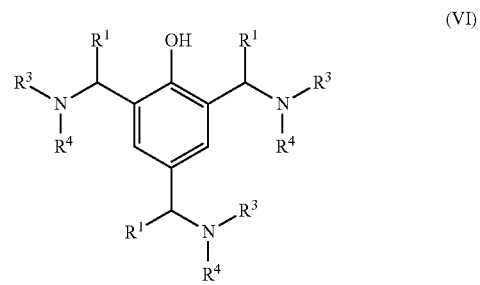

(VI)

In the formula (VI), $R^1$ has the definitions already given, and $R^3$ and $R^4$ are each identical or different alkyl, cycloalkyl or aralkyl radicals which have 1 to 4 carbon atoms and optionally contain ether oxygen or amine nitrogen, or together are an alkylene radical which has 4 to 8 carbon atoms and optionally contains ether oxygen or amine nitrogen.

Preferably, $R^3$ and $R^4$ are each methyl or ethyl or butyl or isobutyl, especially each methyl.

This reaction is a transamination. The amine of the formula $R^3$—NH—$R^4$ released is preferably removed from the reaction mixture during the reaction, especially by distillation. The reaction conditions in the transamination are advantageously chosen such that just one of the two amino groups of the diamine of the formula (III) is alkylated and hence a minimum level of polycyclic by-products is formed.

The transamination gives rise to a reaction product that typically contains proportions of amines of the formula (I) in which X is

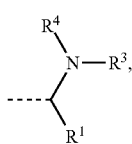

especially N,N-dimethylaminomethyl.

A preferred Mannich base of the formula (VI) is 2,4,6-tris(N,N-dimethylaminomethyl)phenol. It is preparable in a particularly simple manner from inexpensive raw materials and is commercially available in high purity. Moreover, the dimethylamine released therefrom can be removed particularly efficiently from the reaction mixture by means of distillation owing to its relatively low boiling point.

Preferred reaction products from the transamination described especially comprise amines of the formula (I b)

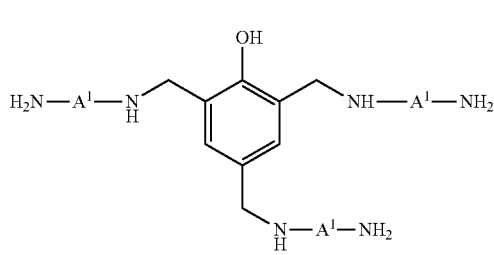

where $A^1$ has the definitions already given.

A suitable amine of the formula (I) is also obtainable from the reaction of at least one primary diamine of the formula (III) with at least one aldehyde or ketone of the formula (VII) and hydrogen.

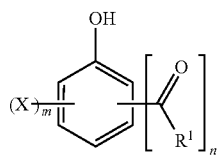

In the formula (VII), $R^1$, X, m and n have the definitions already given.

Preferably, m here is 0 or 1, especially 0.

Preferably, n here is 1.

X here is preferably methyl or methoxy or hydroxyl.

This reaction is a reductive alkylation. The reductive alkylation can be effected directly with molecular hydrogen or indirectly by hydrogen transfer from other reagents. Preference is given to using molecular hydrogen. The reaction conditions are advantageously chosen such that just one of the two amino groups of the primary diamine of the formula (III) is monoalkylated with good selectivity and the aromatic ring is not hydrogenated. Preference is given to working at a hydrogen pressure of 5 to 100 bar and a temperature of 40 to 120° C., and in the presence of a suitable catalyst. Preferred catalysts are palladium on charcoal (Pd/C), platinum on charcoal (Pt/C), Adams catalyst or Raney nickel, especially palladium on charcoal or Raney nickel.

Suitable aldehydes or ketones of the formula (VII) are especially 2-hydroxybenzaldehyde (salicylaldehyde), 3-hydroxybenzaldehyde, 4-hydroxybenzaldehyde, 2-hydroxy-3-methylbenzaldehyde, 2-hydroxy-5-methylbenzaldehyde, 4-hydroxy-3,5-dimethylbenzaldehyde, 2-hydroxy-3-methoxybenzaldehyde (o-vanillin), 2-hydroxy-4-methoxybenzaldehyde, 2-hydroxy-5-methoxybenzaldehyde, 3-hydroxy-4-methoxybenzaldehyde (isovanillin), 4-hydroxy-2-methoxybenzaldehyde, 4-hydroxy-3-methoxybenzaldehyde (vanillin), 6-hydroxy-2,4-dimethoxybenzaldehyde, 2,3-dihydroxybenzaldehyde, 2,4-dihydroxybenzaldehyde (β-resorcinaldehyde), 2,5-dihydroxybenzaldehyde (gentisinaldehyde), 3,4-dihydroxybenzaldehyde, 3,5-dihydroxybenzaldehyde, 2,3,4-trihydroxybenzaldehyde, 2'-hydroxyacetophenone, 3'-hydroxyacetophenone, 4'-hydroxyacetophenone, 4'-hydroxy-3'-methoxyacetophenone (acetovanillone), 4'-hydroxy-3',5'-dimethoxyacetophenone, 2',4'-dihydroxyacetophenone (resacetophenone), 2',5'-dihydroxyacetophenone (quinacetophenone), 2',6'-dihydroxyacetophenone (2-acetylresorcinol), 2',4'-dihydroxyacetophenone, 4-hydroxybenzophenone or 2-hydroxy-4-methoxybenzophenone.

Among these, preference is given to salicylaldehyde, 3-hydroxybenzaldehyde, 4-hydroxybenzaldehyde, o-vanillin, isovanillin, vanillin, β-resorcinaldehyde, gentisinaldehyde, 3,4-dihydroxybenzaldehyde, 2'-hydroxyacetophenone, 3'-hydroxyacetophenone, 4'-hydroxyacetophenone, acetovanillone or resacetophenone.

Particular preference is given to salicylaldehyde or 2'-hydroxyacetophenone.

Preferred reaction products from the reductive alkylation described especially comprise amines of the formula (I c)

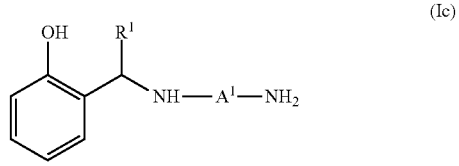

where $R^1$ and $A^1$ have the definitions already given.

Amines of the formula (I c) are particularly reactive toward epoxy resins since they have a comparatively high content of phenol groups.

The amine of the formula (I) is thus preferably used in the form of a reaction product from a reaction selected from the group consisting of
(i) reaction of
  at least one primary diamine of the formula (III),
  at least one aldehyde of the formula (IV)
  and at least one phenol compound of the formula (V) with elimination of water,
(ii) reaction of
  at least one primary diamine of the formula (III) and
  at least one Mannich base of the formula (VI)
  with elimination of amine of the formula $R^3$—NH—$R^4$
  and
(iii) reaction of
  at least one primary diamine of the formula (III),
  at least one aldehyde or ketone of the formula (VII)
  and hydrogen
  with elimination of water.

A reaction product from the reaction (i) ("Mannich reaction") has the advantage that it is preparable in a simple and inexpensive process from a multitude of industrially obtainable starting compounds in broad structural variety. In the case of (partial) use of cardanol as phenol compound of the formula (V), the reaction product is also largely or entirely free of toxic phenols of low molecular weight, such as phenol itself or alkylphenols such as cresol, tert-butylphenol or nonylphenol.

A reaction product from the reaction (ii) ("transamination") has the advantage that it is free of toxic phenols of low molecular weight, such as phenol itself or alkylphenols such as cresol, tert-butylphenol or nonylphenol, and that, especially in the case of use of 2,4,6-tris(N,N-dimethylaminomethyl)phenol which is commercially available in high purity, it is preparable inexpensively and in a simple manner.

A reaction product from the reaction (iii) ("reductive alkylation") has the advantage that it is particularly pure and has particularly low viscosity, includes particularly highly reactive amines of the formula (I) and does not contain any toxic phenols of low molecular weight, such as phenol itself or alkylphenols such as cresol, tert-butylphenol or nonylphenol.

Preferably, the primary diamine of the formula (III) here is in each case selected from the group consisting of ethylene-1,2-diamine, propylene-1,3-diamine, 2-methylpentane-1,5-diamine, hexane-1,6-diamine, 2,2(4),4-trimethylhexane-1,6-diamine, 1,3-bis(aminomethyl)cyclohexane, 1,3-bis(aminomethyl)benzene, 3-aminomethyl-3,5,5-trimethylcyclohexylamine, diethylenetriamine (DETA), triethylenetetramine (TETA), tetraethylenepentamine (TEPA), dipropylenetriamine (DPTA), 3-(2-aminoethyl)aminopropylamine (N3 amine), N,N'-bis(3-aminopropyl)ethylenediamine (N4 amine) and bis(hexamethylene)triamine (BHMT).

The amine of the formula (I) enables hardeners for epoxy resins which enable particularly rapid curing at low ambient temperatures, for example at 8° C. But without efficient dilution, its viscosity is too high for many epoxy resin products, and it has a tendency to yellow.

The hardener for epoxy resins further comprises at least one amine of the formula (II).

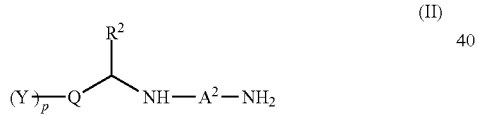

(II)

$A^2$ is preferably 1,2-propylene. These amines of the formula (II) have a particularly low tendency to carbamatization and enable epoxy resin compositions having particularly nice surfaces.

$R^2$ is preferably a hydrogen radical or is methyl, especially a hydrogen radical. These amines of the formula (II) are particularly easily obtainable and enable particularly low-viscosity hardeners and epoxy resin compositions.

Preferably, Q is an optionally Y-substituted phenyl radical. These amines enable particularly rapid curing and particularly nice surfaces.

Y preferably represents identical or different radicals selected from the group consisting of alkyl, alkoxy and dialkylamino each having 1 to 12, especially 1 to 4, carbon atoms. More preferably, Y is methyl or is methoxy or is dimethylamino. Most preferably, Y is methoxy or is dimethylamino.

Preferably, the Y radical is in the meta and/or para position. In the case that p=1, the Y radical is especially in the para position.

p is preferably 0 or 1 or 2, especially 0 or 1.

More preferably, p is 0. These amines enable particularly low-viscosity epoxy resin compositions.

If p is 1, Q is especially a Y-substituted phenyl radical and Y is especially methoxy or dimethylamino. These amines enable epoxy resin compositions having very particularly rapid curing.

More preferably, $A^2$ is 1,2-propylene, $R^2$ is a hydrogen radical, Q is a phenyl radical and p is 0. Such an amine enables epoxy resin compositions having particularly good processability, very rapid curing and particularly nice surfaces.

The amine of the formula (II) is preferably selected from the group consisting of N-benzylethane-1,2-diamine, N-(4-methoxybenzyl)ethane-1,2-diamine, N-(4-(dimethylamino)benzyl)ethane-1,2-diamine, $N^1$-benzylpropane-1,2-diamine or $N^2$-benzylpropane-1,2-diamine or a mixture of these isomers, $N^1$-(4-methoxybenzyl)propane-1,2-diamine or $N^2$-(4-methoxybenzyl)propane-1,2-diamine or a mixture of these isomers, $N^1$-(4-(dimethylamino)benzyl)propane-1,2-diamine or $N^2$-(4-(dimethylamino)benzyl)propane-1,2-diamine or a mixture of these isomers.

Among these, preference is given to $N^1$-benzylpropane-1,2-diamine or $N^2$-benzylpropane-1,2-diamine or a mixture of these isomers, also referred to hereinafter as N-benzylpropane-1,2-diamine.

The preferred amines of the formula (II) feature particularly good obtainability, particularly low viscosity and good properties in the use of the invention, such as, in particular, rapid curing, high final hardness and barely any tendency to blushing effects.

The amine of the formula (II) is preferably obtained from the monoalkylation of ethylene-1,2-diamine or propylene-1,2-diamine with a suitable alkylating agent, for example an organic halide or a carbonyl compound.

Preferably, the amine of the formula (II) is prepared by reductive alkylation of ethylene-1,2-diamine or propylene-1,2-diamine with an aldehyde or ketone of the formula (VIII) and hydrogen

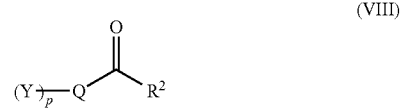

(VIII)

where $R^2$, Q, Y and p have the definitions already given. This preparation proceeds particularly selectively and leads to reaction products of particularly high purity, i.e. with a high content of amines of the formula (II).

The amine of the formula (II) is thus preferably used in the form of a reaction product from the reductive alkylation of ethylene-1,2-diamine or propylene-1,2-diamine with at least one aldehyde or ketone of the formula (II) and hydrogen. Such a reaction product is particularly pure even without complex purification steps, meaning that it contains a high content of amine of the formula (II). As a result, it is of particularly low viscosity and reactive and hence particularly suitable as a constituent of the hardener described.

More preferably, the amine of the formula (II) is used in the form of a reaction product from the alkylation of ethylene-1,2-diamine or propylene-1,2-diamine, especially from reductive alkylation with an aldehyde or ketone of the formula (VIII) and hydrogen. Preferably, the reaction product has been purified by means of distillation. A reaction product purified by means of distillation enables particularly rapid curing rates and particularly high hardening.

The hardener of the invention comprising a combination of amine of the formula (I) and amine of the formula (II)

enables epoxy resin products having surprisingly low viscosity, which thus have good processability, especially also as a self-leveling coating, with rapid curing, especially also under cold conditions, and surprisingly high final hardness, which show barely any blushing-related defects such as a hazy or tacky surface or reduced final hardness and show only minor yellowing.

The hardener may, as well as at least one amine of the formula (I) and at least one amine of the formula (II), additionally comprise at least one further amine that does not correspond to the formula (I) or (II) and/or at least one accelerator.

This further amine is especially not a reactant or by-product from the preparation of the amine of the formula (I) and/or the amine of the formula (II).

Suitable accelerators are substances which accelerate the reaction between amino groups and epoxy groups, especially acids or compounds hydrolyzable to acids, especially organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic esters, other organic or inorganic acids such as, in particular, phosphoric acid, or mixtures of the aforementioned acids and acid esters; tertiary amines such as, in particular, 1,4-diazabicyclo[2.2.2]octane, benzyldimethylamine, α-methylbenzyldimethylamine, triethanolamine, dimethylaminopropylamine, imidazoles such as, in particular, N-methylimidazole, N-vinylimidazole or 1,2-dimethylimidazole, salts of such tertiary amines, quaternary ammonium salts, such as, in particular, benzyltrimethylammonium chloride, amidines such as, in particular, 1,8-diazabicyclo[5.4.0]undec-7-ene, guanidines such as, in particular, 1,1,3,3-tetramethylguanidine, phenols, especially bisphenols, phenolic resins or Mannich bases such as, in particular, 2-(dimethylaminomethyl)phenol, 2,4, 6-tris(dimethylaminomethyl)phenol or polymers of phenol, formaldehyde and N,N-dimethylpropane-1,3-diamine, phosphites such as, in particular, di- or triphenyl phosphites, or compounds having mercapto groups. Preferred accelerators are acids, tertiary amines or Mannich bases.

Most preferred is salicylic acid or 2,4,6-tris(dimethylaminomethyl)phenol or a combination thereof.

Preferred further amines are polyamines having at least two, especially at least three, amine hydrogens reactive toward epoxy groups, especially the following:

polyamines having one or two secondary amino groups, especially products from the reductive alkylation of primary aliphatic polyamines with aldehydes or ketones that do not correspond to the formula (II), such as, in particular, N,N'-dibenzylethane-1,2-diamine, N,N'-dibenzylpropane-1,2-diamine, N-benzyl-1,3-bis(aminomethyl)benzene, N,N'-dibenzyl-1,3-bis(aminomethyl)benzene, N-2-ethylhexyl-1,3-bis(aminomethyl)benzene, N,N'-bis(2-ethylhexyl)-1,3-bis(aminomethyl)benzene, or partially styrenized polyamines such as, in particular, styrenized 1,3-bis(aminomethyl)benzene (available as Gaskamine® 240 from Mitsubishi Gas Chemical);

aliphatic, cycloaliphatic or arylaliphatic primary diamines, especially 2,2-dimethylpropane-1,3-diamine, pentane-1,3-diamine (DAMP), pentane-1,5-diamine, 1,5-diamino-2-methylpentane (MPMD), 2-butyl-2-ethylpentane-1,5-diamine (C11 neodiamine), hexane-1,6-diamine, 2,5-dimethylhexane-1,6-diamine, 2,2(4),4-trimethylhexamethylenediamine (TMD), heptane-1,7-diamine, octane-1,8-diamine, nonane-1,9-diamine, decane-1,10-diamine, undecane-1,11-diamine, dodecane-1,12-diamine, 1,2-, 1,3- or 1,4-diaminocyclohexane, bis(4-aminocyclohexyl)methane ($H_{12}$-MDA), bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane, 1-amino-3-aminomethyl-3,5,5-trimethylcyclohexane (isophoronediamine or IPDA), 2- or 4-methyl-1,3-diaminocyclohexane or mixtures thereof, 1,3-bis(aminomethyl)cyclohexane, 1,4-bis(aminomethyl)cyclohexane, 2,5(2,6)-bis(aminomethyl)bicyclo[2.2.1]heptane (NBDA), 3(4),8(9)-bis(aminomethyl)tricyclo[5.2.1.0$^{2,6}$]decane, 1,4-diamino-2,2,6-trimethylcyclohexane (TMCDA), menthane-1,8-diamine, 3,9-bis(3-aminopropyl)-2,4,8,10-tetraoxaspiro[5.5]undecane, 1,3-bis(aminomethyl)benzene (MXDA) or 1,4-bis(aminomethyl)benzene;

aliphatic primary di- or triamines containing ether groups, especially bis(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine or higher oligomers of these diamines, bis(3-aminopropyl)polytetrahydrofurans or other polytetrahydrofurandiamines, diamines containing cycloaliphatic ether groups from the propoxylation and subsequent amination of 1,4-dimethylolcyclohexane, especially obtainable as Jeffamine® RFD-270 (from Huntsman), or polyoxyalkylenedi- or -triamines that are typically products from the amination of polyoxyalkylenedi- or -triols and are obtainable, for example, under the Jeffamine® name (from Huntsman), under the Polyetheramine name (from BASF) or under the PC Amine® name (from Nitroil). Especially suitable polyoxyalkylenedi- or -triamines are Jeffamine® D-230, Jeffamine® D-400, Jeffamine® D-2000, Jeffamine® EDR-104, Jeffamine® EDR-148, Jeffamine® EDR-176, Jeffamine® T-403, Jeffamine® T-3000, Jeffamine® T-5000, or corresponding amines from BASF or Nitroil;

polyamines having secondary amino groups and having two primary aliphatic amino groups, such as, in particular, 3-(2-aminoethyl)aminopropylamine, bis(hexamethylene)triamine (BHMT), diethylenetriamine (DETA), triethylenetetramine (TETA), tetraethylenepentamine (TEPA), pentaethylenehexamine (PEHA) or higher homologs of linear polyethyleneamines such as polyethylenepolyamine having 5 to 7 ethyleneamine units (called "higher ethylenepolyamine", HEPA), products from the multiple cyanoethylation or cyanobutylation and subsequent hydrogenation of primary di- and polyamines having at least two primary amino groups, such as dipropylenetriamine (DPTA), N-(2-aminoethyl)propane-1,3-diamine (N3 amine), N,N'-bis(3-aminopropyl)ethylenediamine (N4 amine), N,N'-bis(3-aminopropyl)-1,4-diaminobutane, N5-(3-aminopropyl)-2-methylpentane-1,5-diamine, N3-(3-aminopentyl)pentane-1,3-diamine, N5-(3-amino-1-ethylpropyl)-2-methylpentane-1,5-diamine or N,N'-bis(3-amino-1-ethylpropyl)-2-methylpentane-1,5-diamine;

aliphatic, cycloaliphatic or arylaliphatic primary triamines, especially 4-aminomethyloctane-1,8-diamine, 1,3,5-tris(aminomethyl)benzene, 1,3,5-tris(aminomethyl)cyclohexane, tris(2-aminoethyl)amine, tris(2-aminopropyl)amine or tris(3-aminopropyl)amine;

aromatic polyamines such as, in particular, m- and p-phenylenediamine, 4,4'-, 2,4'- and/or 2,2'-diaminodiphenylmethane, 3,3'-dichloro-4,4'-diaminodiphenylmethane (MOCA), tolylene-2,4- and/or -2,6-diamine, mixtures of 3,5-dimethylthiotolylene-2,4- and/or -2,6-diamine (available as Ethacure® 300 from Albermarle), mixtures of 3,5-diethyltolylene-2,4- and/or -2,6-diamine (DETDA, available as Ethacure® 100 from Albermarle), 3,3',5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5'-dimethyl-4,4'-diaminodiphenylmethane (M-MIPA), 3,3',5,5'-tetraisopropyl-4,4'-diaminodiphenylmethane (M-DIPA), 4,4'-diaminodiphenylsulfone (DDS), 4-amino-N-(4-aminophenyl)benzenesulfonamide, 5,5'-methylenedianthranilic acid, dimethyl 5,5'-methylendianthranilate, propylene 1,3-bis(4-aminobenzoate), butylene 1,4-bis(4-aminobenzoate), polytetramethylene oxide bis(4-aminobenzoate) (available as Versalink® from Air Products), 1,2-bis(2-aminophenylthio)ethane, 2-methylpropyl 4-chloro-3,5-diaminobenzoate or tert-butyl (4-chloro-3,5-diaminobenzoate);

polyamidoamines, especially reaction products of a mono- or polybasic carboxylic acid, or the esters or anhydrides thereof, especially a dimer fatty acid, with an aliphatic, cycloaliphatic or aromatic polyamine used in a stoichiometric excess, especially a polyalkyleneamine, for example DETA or TETA, especially the commercially available polyamidoamines Versamid® 100, 125, 140 or 150 (von Cognis), Aradur® 223, 250 or 848 (from Huntsman), Euretek® 3607 or 530 (from Huntsman) or Beckopox® EH 651, EH 654, EH 655, EH 661 or EH 663 (from Cytec);

or adducts of polyamines with epoxides or epoxy resins, especially adducts with diepoxides in a molar ratio of about 2/1, or adducts with monoepoxides in a molar ratio of about 1/1, or reaction products of polyamines and epichlorohydrin, especially those of 1,3-bis(aminomethyl)benzene, commercially available as Gaskamine® 328 (from Mitsubishi Gas Chemical).

It may be advantageous when the hardener of the invention comprises a combination of two or more further amines.

Particularly preferred further amines are polyamines having one primary and one secondary amino group that do not correspond to the formula (II), especially N-benzyl-1,3-bis(aminomethyl)benzene, N-2-ethylhexyl-1,3-bis(aminomethyl)benzene or styrenized 1,3-bis(aminomethyl)benzene.

Particularly preferred further amines are also primary diamines having a molecular weight of at least 120 g/mol, especially at least 150 g/mol, preferably TMD, $H_{12}$-MDA, IPDA, 2- or 4-methyl-1,3-diaminocyclohexane or mixtures thereof, 1,3-bis(aminomethyl)cyclohexane, 1,4-bis(aminomethyl)cyclohexane, NBDA, MXDA or BHMT, especially TMD, $H_{12}$-MDA, IPDA, NBDA, or BHMT.

Particularly preferred further amines are also aliphatic primary di- or triamines containing ether groups, especially polyoxyalkylenedi- or -triamines having an average molecular weight in the range from 200 to 500 g/mol, especially Jeffamine® D-230 or Jeffamine® T-403 (both from Huntsman), or cycloaliphatic diamines containing ether groups from the propoxylation and subsequent amination of 1,4-dimethylolcyclohexane, especially Jeffamine® RFD-270 (from Huntsman).

Particularly preferred further amines are also adducts having at least three amine hydrogens, formed from at least one polyamine having 2 to 12 carbon atoms and at least one epoxide.

Preferred epoxides for such adducts are monoepoxides, especially aromatic monoepoxides, especially cresyl glycidyl ether, tert-butylphenyl glycidyl ether or the glycidyl ether of cardanol. Particular preference is given to cresyl glycidyl ether. Suitable cresyl glycidyl ethers are all isomeric cresyl glycidyl ethers or mixtures thereof, especially commercially available types such as, in particular, Araldite® DY-K (from Huntsman), Polypox™ R6 (from Dow), Heloxy™ KR (from Hexion) or Erisys® GE-10 (from CVC Spec. Chem.)

Preferred epoxides for such an adduct are also diepoxides, especially aromatic diepoxides, especially bisphenol A diglycidyl ethers or bisphenol F diglycidyl ethers or bisphenol A/F diglycidyl ethers or resorcinol diglycidyl ethers, especially commercially available liquid resins.

Particular preference is given to an adduct having at least three amine hydrogens, formed from at least one polyamine with at least one aromatic monoepoxide which are reacted in a molar ratio of about 1/1. The polyamine was especially present in excess during the reaction and has been removed by means of distillation after the reaction.

For such an adduct, the aromatic monoepoxide is preferably a cresyl glycidyl ether, especially ortho-cresyl glycidyl ether.

For such an adduct, the polyamine is preferably ethylene-1,2-diamine, propylene-1,2-diamine, propylene-1,3-diamine or MPMD, more preferably propylene-1,2-diamine or MPMD.

The hardener may further comprise at least one thinner, especially xylene, 2-methoxyethanol, dimethoxyethanol, 2-ethoxyethanol, 2-propoxyethanol, 2-isopropoxyethanol, 2-butoxyethanol, 2-phenoxyethanol, 2-benzyloxyethanol, benzyl alcohol, ethylene glycol, ethylene glycol dimethyl ether, ethylene glycol diethyl ether, ethylene glycol dibutyl ether, ethylene glycol diphenyl ether, diethylene glycol, diethylene glycol monomethyl ether, diethylene glycol monoethyl ether, diethylene glycol mono-n-butyl ether, diethylene glycol dimethyl ether, diethylene glycol diethyl ether, diethylene glycol di-n-butyl ether, propylene glycol butyl ether, propylene glycol phenyl ether, dipropylene glycol, dipropylene glycol monomethyl ether, dipropylene glycol dimethyl ether, dipropylene glycol di-n-butyl ether, N-methylpyrrolidone, diphenylmethane, diisopropylnaphthalene, mineral oil fractions, for example Solvesso® products (from Exxon), alkylphenols such as tert-butylphenol, nonylphenol, dodecylphenol or cardanol (from cashewnutshell oil, comprising, as main constituents, 3-(pentadeca-8-enyl)phenol, 3-(pentadeca-8,11-dienyl)phenol and 3-(pentadeca-8,11,14-trienyl)phenol), available, for example, as Cardolite® NC-700 or Cardolite® NX-2026 (both from Cardolite), styrenized phenol, bisphenols, aromatic hydrocarbon resins, especially types containing phenol groups, alkoxylated phenol, especially ethoxylated or propoxylated phenol, especially 2-phenoxyethanol, adipates, sebacates, phthalates, benzoates, organic phosphoric or sulfonic esters or sulfonamides. Preference is given to benzyl alcohol, dodecylphenol, tert-butylphenol, styrenized phenol, ethoxylated phenol or aromatic hydrocarbon resins containing phenol groups, especially the Novares® products LS 500, LX 200, LA 300 or LA 700 (from Rütgers).

The harder preferably contains only a small content of thinners, if any, preferably less than 25% by weight, more preferably less than 15% by weight, especially preferably less than 10% by weight and in particular less than 5% by weight.

The hardener may comprise further substances reactive toward epoxy groups, for example monoamines such as hexylamine or benzylamine, or compounds having mercapto groups, especially the following:

liquid mercaptan-terminated polysulfide polymers, known by the Thiokol® brand name (from Morton Thiokol; available, for example, from SPI Supplies, or from Toray Fine Chemicals), especially the LP-3, LP-33, LP-980, LP-23, LP-55, LP-56, LP-12, LP-31, LP-32 or LP-2 products; and also known by the Thioplast® brand name (from Akzo Nobel), especially the G 10, G 112, G 131, G 1, G 12, G 21, G 22, G 44 or G 4 products;

mercaptan-terminated polyoxyalkylene ethers obtainable, for example, by reaction of polyoxyalkylenedi- or triols either with epichlorohydrin or with an alkylene oxide, followed by sodium hydrogensulfide;

mercaptan-terminated compounds in the form of polyoxyalkylene derivatives, known by the Capcure® brand name (from Cognis), especially the WR-8, LOF or 3-800 products;

polyesters of thiocarboxylic acids, for example pentaerythritol tetramercaptoacetate, trimethylolpropane trimercaptoacetate, glycol dimercaptoacetate, pentaerythritol tetra(3-mercaptopropionate), trimethylolpropane tri(3-mercaptopropionate) or glycol di(3-mercaptopropionate), or esterification products of polyoxyalkylenediols or -triols, ethoxylated trimethylolpropane or polyester diols with thiocarboxylic acids such as thioglycolic acid or 2- or 3-mercaptopropionic acid; or further compounds having mercapto groups, such as, in particular, 2,4,6-trimercapto-1,3,5-triazine, 2,2'-(ethylenedioxy)diethanethiol (triethylene glycol dimercaptan) or ethanedithiol.

The hardener is preferably largely free of amines having a molecular weight below 150 g/mol, especially below 120 g/mol. It preferably contains less than 2% by weight, especially less than 1% by weight, of amines having a molecular weight below 150 g/mol, especially below 120 g/mol. Such a hardener is particularly advantageous in terms of toxicology and odor and enables coatings having particularly nice surfaces.

The hardener of the invention preferably contains sufficient amine of the formula (I) that 15% to 80%, more preferably 20% to 70%, of the total amine hydrogens in the hardener originate from the amine of the formula (I).

The hardener of the invention preferably contains sufficient amine of the formula (II) that 20% to 70%, more preferably 30% to 60%, of the total amine hydrogens in the hardener originate from the amine of the formula (II).

A particularly preferred hardener comprises, as a further amine, at least one adduct having at least three amine hydrogens, formed from at least one polyamine having 2 to 12 carbon atoms and at least one epoxide.

In such a hardener, the amine of the formula (I), the amine of the formula (II), the adduct and any further amines are present in such an amount that, of the total amine hydrogens present in the hardener, 15% to 50% originate from amines of the formula (I),
30% to 60% originate from amines of the formula (II),
15% to 50% originate from adducts having at least three amine hydrogens
and 0% to 10% originate from further amines.

Such a hardener has low odor and a low viscosity, and forms barely any haziness or crusts on contact with air. With respect to epoxy resins, it has a high thinning effect with particularly good compatibility. It thus enables low-emission epoxy resin compositions which have good processibility, cure particularly rapidly and substantially without blushing effects, and form films of very high gloss and high hardness.

The invention further provides an epoxy resin composition comprising
a resin component comprising at least one epoxy resin and
a hardener component comprising a hardener comprising at least one amine of the formula (I) and at least one amine of the formula (II), as described above.

The resin and the hardener component here are typically present in separate containers and are each storage-stable. They are not mixed with one another until shortly before application, such that the reactive groups thereof come into contact with one another and the composition cures.

Suitable epoxy resins are standard industrial epoxy resins. These are obtained in a known manner, for example from the oxidation of the corresponding olefins or from the reaction of epichlorohydrin with the corresponding polyols, polyphenols or amines.

Particularly suitable epoxy resins are what are called liquid polyepoxide resins, referred to as "liquid resin" hereinafter. These have a glass transition temperature below 25° C.

Likewise possible as epoxy resins are what are called solid resins which have a glass transition temperature above 25° C. and can be comminuted to powders that are pourable at 25° C.

Suitable epoxy resins are especially aromatic epoxy resins, especially the glycidylization products of:

bisphenol A, bisphenol F or bisphenol A/F, where A stands for acetone and F for formaldehyde, which served as reactants for preparation of these bisphenols. In the case of bisphenol F, positional isomers may also be present, especially derived from 2,4'- or 2,2'-hydroxyphenylmethane.

dihydroxybenzene derivatives such as resorcinol, hydroquinone or catechol;

further bisphenols or polyphenols such as bis(4-hydroxy-3-methylphenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxyphenyl)propane, 2,2-bis(3,5-dibromo-4-hydroxyphenyl)propane, 2,2-bis(4-hydroxy-3-tert-butylphenyl)propane, 2,2-bis(4-hydroxyphenyl)butane (bisphenol B), 3,3-bis(4-hydroxyphenyl)pentane, 3,4-bis(4-hydroxyphenyl)hexane, 4,4-bis(4-hydroxyphenyl)heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol Z), 1,1-bis(4-hydroxyphenyl)-3,3,5-trimethylcyclohexane (bisphenol TMC), 1,1-bis(4-hydroxyphenyl)-1-phenylethane, 1,4-bis[2-(4-hydroxyphenyl)-2-propyl]benzene (bisphenol P), 1,3-bis[2-(4-hydroxyphenyl)-2-propyl]benzene (bisphenol M), 4,4'-dihydroxydiphenyl (DOD), 4,4'-dihydroxybenzophenone, bis(2-hydroxynaphth-1-yl)methane, bis(4-hydroxynaphth-1-yl)methane, 1,5-dihydroxynaphthalene, tris(4-hydroxyphenyl)methane, 1,1,2,2-tetrakis(4-hydroxyphenyl)ethane, bis(4-hydroxyphenyl) ether or bis(4-hydroxyphenyl) sulfone;

condensation products of phenols with formaldehyde that are obtained under acidic conditions, such as phenol novolaks or cresol novolaks;

aromatic amines such as aniline, toluidine, 4-aminophenol, 4,4'-methylenediphenyldiamine, 4,4'-methylenediphenyldi(N-methyl)amine, 4,4'-[1,4-phenylenebis(1-methylethylidene)]bisaniline (bisaniline P) or 4,4'-[1,3-phenylenebis(1-methylethylidene)]bisaniline (bisaniline M).

Further suitable epoxy resins are aliphatic or cycloaliphatic polyepoxides, especially

- glycidyl ethers of saturated or unsaturated, branched or unbranched, cyclic or open-chain di-, tri- or tetrafunctional $C_2$ to $C_{30}$ alcohols, especially ethylene glycol, propylene glycol, butylene glycol, hexanediol, octanediol, polypropylene glycols, dimethylolcyclohexane, neopentyl glycol, dibromoneopentyl glycol, castor oil, trimethylolpropane, trimethylolethane, pentaerythritol, sorbitol or glycerol, or alkoxylated glycerol or alkoxylated trimethylolpropane;
- a hydrogenated bisphenol A, F or A/F liquid resin, or the glycidylization products of hydrogenated bisphenol A, F or A/F;
- an N-glycidyl derivative of amides or heterocyclic nitrogen bases, such as triglycidyl cyanurate or triglycidyl isocyanurate, or reaction products of epichlorohydrin with hydantoin.
- epoxy resins from the oxidation of olefins such as, in particular, vinylcylohexene, dicyclopentadiene, cyclohexadiene, cyclododecadiene, cyclododecatriene, isoprene, 1,5-hexadiene, butadiene, polybutadiene or divinylbenzene.

A preferred epoxy resin in the resin component is preferably a liquid resin based on a bisphenol, especially a diglycidyl ether of bisphenol A, bisphenol F or bisphenol A/F, as commercially available, for example, from Dow, Huntsman or Momentive. These liquid resins have a low viscosity for epoxy resins and good properties in the cured state as a coating. They may contain proportions of solid bisphenol A resin or phenol novolaks.

The resin component may comprise a reactive diluent, especially a reactive diluent having at least one epoxy group. Suitable reactive diluents are especially the glycidyl ethers of mono- or polyhydric phenols or aliphatic or cycloaliphatic alcohols, such as, in particular, the polyglycidyl ethers of di- or polyols that have already been mentioned, but additionally phenyl glycidyl ether, cresyl glycidyl ether, guaiacol glycidyl ether, 4-methoxyphenyl glycidyl ether, p-n-butylphenyl glycidyl ether, p-tert-butylphenyl glycidyl ether, 4-nonylphenyl glycidyl ether, 4-dodecylphenyl glycidyl ether, cardanol glycidyl ether, benzyl glycidyl ether, allyl glycidyl ether, butyl glycidyl ether, hexyl glycidyl ether, 2-ethylhexyl glycidyl ether, or glycidyl ethers of natural alcohols, such as, in particular, $C_8$- to $C_{10}$-alkyl glycidyl ethers or $C_{12}$- to $C_{14}$-alkyl glycidyl ethers. The addition of a reactive diluent to the epoxy resin brings about a reduction in viscosity and/or a reduction in glass transition temperature and/or the mechanical values.

The epoxy resin composition optionally comprises further constituents, especially auxiliaries and additives used customarily in epoxy resin compositions, for example the following:

- solvents, thinners or extenders, such as, in particular, the thinners already mentioned;
- reactive diluents, especially reactive diluents having epoxy groups as mentioned above, epoxidized natural oils such as soybean oil, linseed oil or palm kernel oil, or compounds having acetoacetate groups, especially acetoacetylated polyols, butyrolactone, carbonates, aldehydes, and also isocyanates or silicones having reactive groups;
- polymers, especially polyamides, polysulfides, polyvinyl formal (PVF), polyvinyl butyral (PVB), polyurethanes (PUR), polymers having carboxyl groups, polyamides, butadiene-acrylonitrile copolymers, styrene-acrylonitrile copolymers, butadiene-styrene copolymers, homo- or copolymers of unsaturated monomers, especially from the group comprising ethylene, propylene, butylene, isobutylene, isoprene, vinyl acetate or alkyl (meth)acrylates, especially chlorosulfonated polyethylenes or fluorine-containing polymers, sulfonamide-modified melamines or purified montan waxes;
- inorganic or organic fillers, especially ground or precipitated calcium carbonates, optionally coated with fatty acids, especially stearates, baryte (heavy spar), talcs, quartz flours, quartz sand, iron mica, dolomites, wollastonites, kaolins, mica (potassium aluminum silicate), molecular sieves, aluminum oxides, aluminum hydroxides, magnesium hydroxide, silicas, cements, gypsums, fly ashes, carbon black, graphite, metal powders such as aluminum, copper, iron, zinc, silver or steel, PVC powder or hollow spheres;
- fibers, especially glass fibers, carbon fibers, metal fibers, ceramic fibers or polymer fibers such as polyamide fibers or polyethylene fibers;
- pigments, especially titanium dioxide and/or iron oxides;
- the aforementioned accelerators;
- rheology modifiers, especially thickeners and antisettling agents;
- adhesion improvers, especially organoalkoxysilanes;
- stabilizers against oxidation, heat, light or UV radiation;
- flame-retardant substances, especially aluminum hydroxide (ATH), magnesium dihydroxide (MDH), antimony trioxide, antimony pentoxide, boric acid ($B(OH)_3$), zinc borate, zinc phosphate, melamine borate, melamine cyanurate, ammonium polyphosphate, melamine phosphate, melamine pyrophosphate, polybrominated diphenyl oxides or diphenyl ethers, phosphates such as, in particular, diphenyl cresyl phosphate, resorcinol bis(diphenylphosphate), resorcinol diphosphate oligomer, tetraphenylresorcinol diphosphite, ethylenediamine diphosphate or bisphenol A bis(diphenylphosphate), tris(chloroethyl) phosphate, tris(chloropropyl) phosphate or tris(dichloroisopropyl) phosphate, tris[3-bromo-2,2-bis(bromomethyl)propyl] phosphate, tetrabromobisphenol A, bis(2,3-dibromopropyl ether) of bisphenol A, brominated epoxy resins, ethylenebis(tetrabromophthalimide), ethylenebis(dibromonorbornanedicarboximide), 1,2-bis(tribromophenoxy)ethane, tris(2,3-dibromopropyl) isocyanurate, tribromophenol, hexabromocyclododecane, bis(hexachlorocyclopentadieno)cyclooctane or chloroparaffins;
- surface-active substances, especially wetting agents, leveling agents, deaerating agents or defoamers;
- biocides, for example algicides, fungicides or substances that inhibit fungal growth.

Preferably, the epoxy resin composition comprises further auxiliaries and additives, especially wetting agents, leveling agents, defoamers, stabilizers, pigments and/or accelerators, especially salicylic acid and/or 2,4,6-tris(dimethylaminomethyl)phenol.

Preferably, the epoxy resin composition contains only a small content, if any, of thinners, preferably not more than 10% by weight, especially not more than 5% by weight.

In the epoxy resin composition, the ratio of the number of groups reactive toward epoxy groups relative to the number of epoxy groups is preferably in the range from 0.5 to 1.5, especially 0.7 to 1.2.

The two components of the epoxy resin composition are each stored in a separate container. Further constituents of the epoxy resin composition may be present as a constituent of the resin component or of the hardener component; further constituents reactive toward epoxy groups are preferably a constituent of the hardener component. A suitable container for storage of the resin component or the hardener component is especially a vat, a hobbock, a bag, a bucket, a can, a cartridge or a tube. The components are storable, meaning that they can be stored prior to use for several months up to one year or longer, without any change in their respective properties to a degree of relevance to their use. For use of the epoxy resin composition, the resin component and the hardener component are mixed with one another shortly before or during application. The mixing ratio between the two components is preferably chosen such that the groups of the hardener component that are reactive toward epoxy groups are in a suitable ratio to the epoxy groups of the resin component, as described above. In parts by weight, the mixing ratio between the resin component and the hardener component is typically in the range from 1:10 to 10:1.

The mixing of the two components is effected by means of a suitable method; it can be effected continuously or batchwise. If the mixing precedes the application, it must be ensured that not too much time passes between the mixing of the components and the application, since this can result in defects, for example slowed or incomplete buildup of adhesion to the substrate. The mixing is especially effected at ambient temperature, which is typically within the range from about 5 to 50° C., preferably about 10 to 30° C.

On mixing of the resin component and the hardener component, the curing commences by chemical reaction. The epoxy groups react with the amino groups bearing amine hydrogen and any further groups reactive toward epoxy groups that are present with ring opening to give amino alcohol units. Further epoxy groups react with themselves in anionic polymerization. As a result of these reactions, the composition cures to give a crosslinked polymer. The person skilled in the art is aware that primary amino groups are difunctional with respect to epoxy groups, and one primary amino group thus counts as two groups reactive toward epoxy groups.

The curing is especially effected at ambient temperature. It typically extends over a few days to weeks until it is substantially complete under the given conditions. The duration depends upon factors including the temperature, the reactivity of the constituents and the stoichiometry thereof, and on the presence of accelerators.

The invention thus further provides a cured composition obtained from the curing of an epoxy resin composition described.

The epoxy resin composition is applied to at least one substrate, the following substrates being particularly suitable:

glass, glass ceramic, concrete, mortar, brick, tile, gypsum and natural rocks such as granite or marble;
metals or alloys such as aluminum, iron, steel and non-ferrous metals, or surface-finished metals or alloys such as galvanized or chromed metals;
leather, textiles, paper, wood, woodbase materials bonded with resins, e.g. phenolic, melamine or epoxy resins, resin-textile composites or further polymer composites;
polymers, especially rigid or flexible PVC, ABS, polycarbonate (PC), polyamide (PA), polyesters, PMMA, epoxy resins, PUR, POM, PO, PE, PP, EPM or EPDM, where the polymers have optionally been surface-treated by means of plasma, corona or flames;
fiber-reinforced plastics, such as carbon fiber-reinforced plastics (CFP), glass fiber-reinforced plastics (GFP) or sheet molding compounds (SMC);
coated substrates such as powder-coated metals or alloys; paints or varnishes.

The substrates can be pretreated if required prior to the application of the epoxy resin composition. Pretreatments of this kind especially include physical and/or chemical cleaning methods, for example sanding, sandblasting, shotblasting, brushing and/or blowing, and also treatment with detergents or solvents, or the application of an adhesion promoter, an adhesion promoter solution or a primer.

The epoxy resin composition described is advantageously usable as fiber composite matrix for fiber composite materials (composites) such as, in particular, CFP or GFP, or as a potting compound, sealant, adhesive, covering, coating, paint, varnish, seal, basecoat or primer.

It is especially usable as a potting compound, for example as an electrical potting compound, or as an adhesive, especially as a bodywork adhesive, sandwich element adhesive, half-shell adhesive for rotor blades of wind turbines, bridge element adhesive or anchoring adhesive.

It is especially also usable as a covering, coating, paint, varnish, seal, basecoat or primer for construction and industrial applications, especially as a floor covering or floor coating for interiors such as offices, industrial halls, gym halls or cooling spaces, or outdoors for balconies, terraces, parking decks, bridges or roofs, as a protective coating for concrete, cement, metals, plastics or wood, for example for surface sealing of wood constructions, vehicles, loading areas, tanks, silos, shafts, pipelines, machines or steel constructions, for example of ships, piers, offshore platforms, lock gates, hydroelectric power plants, river constructions, swimming pools, wind turbines, bridges, chimneys, cranes or sheet-pile walls.

It is also especially usable as a basecoat, undercoat, tiecoat or anticorrosion primer.

Especially when it is used as a coating, covering or paint, it is possible to apply a further coating, further covering or further paint to the fully or partly cured epoxy resin composition, in which case said further layer may likewise be an epoxy resin composition, or else another material, especially a polyurethane or polyurea coating.

Particularly advantageously, the epoxy resin composition described is used as a coating.

The invention accordingly further provides a coating comprising an epoxy resin composition as described above.

Coatings are understood here to mean coverings of all kinds that are applied over an area, especially paints, varnishes, seals, basecoats or primers, as described above, or floor coverings or protective coatings, especially also those for heavy-duty corrosion protection.

Particularly advantageously, the epoxy resin composition described is used in low-emission coatings with environmental quality seals, for example according to Emicode (EC1 Plus), AgBB, DIBt, Der Blaue Engel, AFSSET, RTS (M1) and US Green Building Council (LEED).

As a coating, the epoxy resin composition is advantageously used in a method of coating, wherein it has a fluid consistency with low viscosity and good leveling properties, and is especially applied as a self-leveling or thixotropic coating to predominantly even areas or as a paint. Preferably, the epoxy resin composition on application, immediately after the resin component and the hardener component have been mixed, has a viscosity, measured at 20° C., in the range from 300 to 4'000 mPa·s, preferably in the range from 300 to 2'000 mPa·s, more preferably in the range from 300 to 1'500 mPa·s. The mixed composition is applied to a substrate within the processing time over an area as a thin film having a layer thickness of typically about 50 µm to about 5 mm, typically at ambient temperature. Application is effected especially by pouring onto the substrate to be coated and subsequent homogeneous distribution with the aid, for example, of a coating bar or a notched trowel. Application can also be effected with a brush or roller or in the form of a spray application, for example as an anticorrosion coating on steel.

Curing typically gives rise to substantially clear, glossy and nontacky films of high hardness which have good adhesion to a wide variety of different substrates.

The application of the epoxy resin composition gives rise to an article comprising the cured composition from the curing of the epoxy resin composition described. The cured composition is especially in the form of a coating.

The epoxy resin composition described features advantageous properties. It is low in odor and emissions and has low viscosity and hence very good processability, and shows barely any blushing-related defects even under unfavorable curing conditions. It cures rapidly even at comparatively low temperatures, for example at 8° C., and forms high-quality polymers of high hardness and with an even, non-tacky surface having high gloss and a low tendency to yellowing.

EXAMPLES

Adduced hereinafter are working examples which are intended to elucidate the invention described in detail. It will be appreciated that the invention is not restricted to these described working examples.

"AHEW" stands for amine hydrogen equivalent weight.
"EEW" stands for epoxy equivalent weight.
"Standard climatic conditions" refer to a temperature of 23±1° C. and a relative air humidity of 50±5%. "SCC" stands for "standard climatic conditions".
Description of Test Methods:
Viscosity was measured on a thermostated Rheotec RC30 cone-plate viscometer (cone diameter 50 mm, cone angle 1°, cone tip-plate distance 0.05 mm, shear rate 10 rpm).
Amine value was determined by means of titration (with 0.1N $HClO_4$ in acetic acid versus crystal violet).
Substances Containing Amines of the Formula (I) Used:
Cardolite® GX-6013:
phenalkamine hardener from Cardolite with AHEW 180 g/mol containing 20% to 30% by weight of cardanol and about 1% by weight of 1,3-bis(aminomethyl)benzene.
Substances Containing Amines of the Formula (II) Used:
N-Benzylpropane-1,2-diamine:
A round-bottom flask was initially charged with 444.8 g (6 mol) of propane-1,2-diamine under a nitrogen atmosphere at room temperature. With good stirring, a solution of 212.2 g (2 mol) of benzaldehyde in 1500 mL of isopropanol was slowly added dropwise, and the mixture was stirred for 2 hours. The reaction mixture was then hydrogenated in a continuous hydrogenation apparatus with a Pd/C fixed bed catalyst at a hydrogen pressure of 90 bar, a temperature of 85° C. and a flow rate of 5 mL/min. To monitor the reaction, IR spectroscopy was used to check whether the imine band at about 1665 $cm^{-1}$ had disappeared. Thereafter, the hydrogenated solution was concentrated on a rotary evaporator at 65° C., removing unreacted propane-1,2-diamine and isopropanol. A clear, pale yellowish liquid was obtained. 300 g of this were distilled at 80° C. under reduced pressure, with collection of 237.5 g of distillate at a vapour temperature of 60 to 63° C. and 0.08 to 0.09 bar. A colorless liquid having an amine value of 682 mg KOH/g was obtained, which, by $^1$H NMR, was a mixture of N-benzylpropane-1,2-diamine and $N^2$-benzylpropane-1,2-diamine in a ratio of about 2/1 and had a GC purity of >97%.
Further Substances Used:
Araldite® GY 250: bisphenol A diglycidyl ether, EEW 187.5 g/eq (from Huntsman)
Araldite® DY-E: monoglycidyl ether of $C_{12}$ to $C_{14}$ alcohols, EEW 290 g/eq (from Huntsman)
EP adduct 1: reaction product of 1,5-diamino-2-methylpentane and Araldite® DY-K, prepared as described hereinafter, AHEW 106.5 g/eq
EP adduct 2: reaction product of propylene-1,2-diamine and Araldite® DY-K, prepared as described hereinafter, AHEW 90.0 g/eq
Araldite® DY-K: cresyl glycidyl ether, EEW 182 g/eq (from Huntsman)
Gaskamine® 240: styrenized 1,3-bis(aminomethyl)benzene, AHEW 103 g/eq (from Mitsubishi Gas Chemical)
MXDA: 1,3-bis(aminomethyl)benzene, AHEW 34 g/eq (from Mitsubishi Gas Chemical)
IPDA: 3-aminomethyl-3,5,5-trimethylcyclohexylamine, AHEW 42.6 g/eq (Vestamin® IPD from Evonik)
TMD 2,2(4),4-trimethylhexamethylenediamine, AHEW 39.6 g/eq (Vestamin® TMD from Evonik)
1,3-BAC 1,3-bis(aminomethyl)cyclohexane, AHEW 35.5 g/eq (from Mitsubishi Gas Chemical)
MCDA: 2-methylcyclohexane-1,3(5)-diamine, AHEW 32 g/eq (Baxxodur® EC 210 from BASF)

EP adduct 1 was prepared by heating an initial charge of 4.65 kg of 1,5-diamino-2-methylpentane (Dytek® A from Invista) under a nitrogen atmosphere to 70° C. and then, with good stirring, slowly adding 1.83 kg of Araldite® DY-K, in the course of which the temperature of the reaction mixture was 70 to 80° C. After 1 hour at 80° C., the reaction mixture was cooled down and 1,5-diamino-2-methylpentane and further volatile constituents were removed by distillation by means of a thin-film evaporator (0.5-1 m bar, jacket temperature 160° C.).

EP adduct 2 was prepared by heating an initial charge of 4.15 kg of propylene-1,2-diamine under a nitrogen atmosphere to 70° C. and then, with good stirring, slowly adding 2.93 kg of Araldite® DY-K, in the course of which the temperature of the reaction mixture was 70 to 80° C. After 1 hour at 80° C., the reaction mixture was cooled down and propylene-diamine and further volatile constituents were removed by distillation by means of a thin-film evaporator (0.5-1 m bar, jacket temperature 115° C.).
Production of Hardeners and Epoxy Resin Compositions:

For each example, the ingredients specified in table 1 or 2 were mixed in the specified amounts (in parts by weight) of the hardener component by means of a centrifugal mixer (SpeedMixer™ DAC 150, FlackTek Inc.) and stored with exclusion of moisture.

The ingredients of the resin component specified in table 1 or 2 were likewise processed and stored.

Subsequently, the two components of each composition were processed by means of the centrifugal mixer to give a homogeneous liquid and this was tested immediately as follows:
10 minutes after mixing, the viscosity was determined at 20° C. ("Viscosity (10')").

A first film was coated onto a glass plate in a layer thickness of 500 μm, and stored/cured under standard climatic conditions. König hardness (König pendulum hardness, measured according to DIN EN ISO 1522) was determined on this film after 1 day ("König hardness (1 d SCC)"), after 2 days ("König hardness (2 d SCC)"), after 4 days ("König hardness (4 d SCC)"), after 7 days ("König hardness (7 d SCC)") and after 14 days ("König hardness (14 d SCC)"). After 14 days, the appearance of the film was assessed (designated "Appearance (SCC)" in the table). A "nice" film referred to one which was clear and had a shiny and nontacky surface with no structure. "Structure" refers to any kind of drawing or pattern on the surface.

A second film was applied to a glass plate in a layer thickness of 500 μm and, immediately after application, this was stored (i.e. cured) at 8° C. and 80% relative humidity for 7 days and then under standard climatic conditions for 14 days. 24 hours after application, a polypropylene bottletop beneath which a small moist sponge had been positioned was placed onto the film. After a further 24 hours, the sponge and the lid were removed and positioned at a new point on the film, where it was removed again and repositioned after 24 hours, a total of 4 times. Subsequently, the appearance of this film was assessed (designated as "Appearance (8°/80° C.)" in the tables), in the same way as described for Appearance (SCC). Also reported in each case here was the number of markings that were visible in the film as a result of the moist sponge and/or the lid on top. Again, the König hardness was determined on the films thus cured, in each case after 7 days at 8° C. and 80% relative humidity ("König hardness (7 d 8°/80%)"), then after a further 2 days under SCC ("König hardness (+2 d SCC)"), 7 days under SCC ("König hardness (+7 d SCC)") and 14 d under SCC ("König hardness (+14 d SCC)").

A further measure of yellowing that was determined was the change in color after weathering stress in a weathering tester. For this purpose, a further film in a layer thickness of 500 μm was coated onto a glass plate and stored (i.e. cured) under standard climatic conditions for 2 weeks and then subjected to weathering stress in a weathering tester of the Q-Sun Xenon Xe-1 type with a Q-SUN Daylight-Q optical filter and a xenon lamp with a light intensity of 0.51 W/m² at 340 nm at a temperature of 65° C. for 72 hours (Q-Sun (72 h)). Subsequently, the color difference ΔE of the film thus subjected to weathering stress as compared with the corresponding unstressed film was determined by means of an NH310 colorimeter from Shenzen 3NH Technology Co. LTD, equipped with silicon photoelectric diode detector, light source A, color space measurement interface CIE L*a*b*C*H*. A high ΔE value means a great difference in color, i.e. significant yellowing.

The results are reported in tables 1 and 2.

The epoxy resin compositions EZ-1 to EZ-3 are inventive examples. The epoxy resin compositions Ref-1 to Ref-7 are comparative examples.

TABLE 1

Composition and properties of EZ-1 to EZ-3 and Ref-1.

| Example | EZ-1 | EZ-2 | EZ-3 | Ref-1 |
|---|---|---|---|---|
| Resin component: | | | | |
| Araldite ® GY-250 | 167.2 | 167.2 | 167.2 | 167.2 |
| Araldite ® DY-E | 31.8 | 31.8 | 31.8 | 31.8 |
| Hardener component: | | | | |
| Cardolite ® GX-6013 | 90.0 | 45.0 | 45.0 | 180.0 |
| N-Benzylpropane-1,2-diamine | 27.4 | 27.4 | 27.4 | — |
| EP adduct 1 | — | 26.6 | — | — |
| EP adduct 2 | — | — | 22.5 | — |
| Viscosity (10') [Pa · s] | 1.3 | 1.0 | 1.1 | 4.4 |
| König hardness (1 d SCC) [s] | 76 | 63 | 66 | 91 |
| (2 d SCC) | 120 | 116 | 119 | 118 |
| (4 d SCC) | 141 | 137 | 148 | 132 |
| (7 d SCC) | 154 | 153 | 164 | 139 |
| (14 d SCC) | 162 | 169 | 181 | 133 |
| Appearance (SCC) | nice | nice | nice | nice |
| Q-Sun (72 h) ΔE | 30 | 26 | 27 | 47 |
| König hardness (7 d 8°/80%) [s] | 56 | 53 | 59 | 78 |
| (+2 d SCC) | 119 | 125 | 134 | 122 |
| (+7 d SCC) | 125 | 143 | 144 | 137 |
| (+14 d SCC) | 161 | 161 | 174 | 143 |
| Appearance (8°/80%) | nice | nice | nice | nice |
| Number of marks | 1 | 1 | 1 | none |

TABLE 2

Composition and properties of Ref-2 to Ref-7.

| Example | Ref-2 | Ref-3 | Ref-4 | Ref-5 | Ref-6 | Ref-7 |
|---|---|---|---|---|---|---|
| Resin component: | | | | | | |
| Araldite ® GY-250 | 167.2 | 167.2 | 167.2 | 167.2 | 167.2 | 167.2 |
| Araldite ® DY-E | 31.8 | 31.8 | 31.8 | 31.8 | 31.8 | 31.8 |
| Hardener component: | | | | | | |
| Cardolite ® GX-6013 | 117.0 | 90.0 | 90.0 | 90.0 | 90.0 | 90.0 |
| Gaskamine ® 240 | 36.1 | — | — | — | — | — |
| MXDA | — | 17.0 | — | — | — | — |
| IPDA | — | — | 21.3 | — | — | — |
| TMD | — | — | — | 19.8 | — | — |
| 1,3-BAC | — | — | — | — | 17.8 | — |
| MCDA | — | — | — | — | — | 16.0 |
| Viscosity (10') [Pa · s] | 2.4 | 2.2 | 2.6 | 2.1 | 2.5 | 2.1 |
| König hardness (1 d SCC) [s] | 66 | 109 | 105 | 98 | 120 | 101 |
| (2 d SCC) | 99 | 129 | 140 | 129 | 144 | 143 |
| (4 d SCC) | 120 | 144 | 154 | 134 | 150 | 160 |
| (7 d SCC) | 132 | 147 | 167 | 140 | 168 | 168 |
| (14 d SCC) | 140 | 151 | 165 | 148 | 157 | 167 |
| Appearance (SCC) | nice | matt/hazy | nice | nice | slight drawing | nice |
| Q-Sun (72 h) ΔE | 34 | 26 | 30 | 33 | 29 | 26 |
| König hardness (7 d 8°/80%) [s] | 53 | 87 | 83 | 57 | 80 | 74 |
| (+2 d SCC) | 95 | 106 | 94 | 74 | 111 | 109 |
| (+7 d SCC) | 99 | 129 | 140 | 78 | 119 | 122 |
| (+14 d SCC) | 132 | 129 | 147 | 99 | 139 | 144 |
| Appearance (8°/80%) | nice | matt/hazy | matt | matt | slightly matt | nice |
| Number of marks | 1 | 2 | 3 | 1 | 1 | 3 |

The invention claimed is:

1. An epoxy resin composition comprising:
   a resin component comprising at least one epoxy resin and
   a hardener component comprising a hardener for curing the at least one epoxy resin, wherein the hardener comprises:
at least one amine of formula (I):

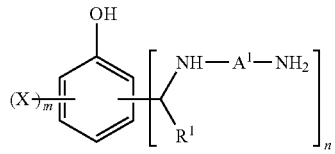
(I)

where
A¹ is an alkylene radical having 2 to 15 carbon atoms, A¹ optionally contains cycloalkyl or aryl rings, A¹ optionally contains ether oxygen or amine nitrogen, and A¹ is not 1,2-propylene,
R¹ is hydrogen, an alkyl radical having 1 to 8 carbon atoms or a phenyl radical,
X is an alkenyl radical having 2 to 18 carbon atoms,
m is 1, and
n is 1; and
at least one amine of formula (II):

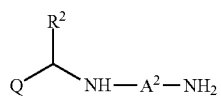
(II)

where
A² is 1,2-ethylene or 1,2-propylene,
R² is hydrogen, and
Q is phenyl,
wherein the at least one amine of formula (I) is present in an amount such that 15% to 80% of a total amine hydrogens in the hardener originate from the at least one amine of formula (I), and
the at least one amine of formula (II) is present in an amount such that 20% to 50% of the total amine hydrogens in the hardener originate from the at least one amine of formula (II).

2. The epoxy resin composition as claimed in claim 1, wherein A¹ is selected from the group consisting of 1,2-ethylene, 1,3-propylene, 2-methyl-1,5-pentylene, 1,6-hexylene, 2,2(4),4-trimethyl-1,6-hexylene, 1,3-cyclohexylenebis(methylene), 1,3-phenylenebis(methylene), (1,5,5-trimethylcyclohexan-1-yl)methane-1,3, 3-aza-1,5-pentylene, 3,6-diaza-1,8-octylene, 3,6,9-triaza-1,11-undecylene, 4-aza-1,7-heptylene, 3-aza-1,6-hexylene, 4,7-diaza-1,10-decylene, and 7-aza-1,13-tridecylene.

3. The epoxy resin composition as claimed in claim 1, wherein X is selected from the group consisting of pentadeca-8-enyl, pentadeca-8,11-dienyl, and pentadeca-8,11,14-trienyl.

4. The epoxy resin composition as claimed in claim 1, wherein X is selected from the group consisting of pentadeca-8-enyl, pentadeca-8,11-dienyl, and pentadeca-8,11,14-trienyl, and where the X radical is in the 3 position and the amine-containing radical associated with variable n is in the 2, 4 or 6 position, based on the phenolic OH.

5. The epoxy resin composition as claimed in claim 1, wherein the amine of formula (I) is a reaction product of a reaction (i) or (iii):

(i) reaction of
a primary diamine of formula (III)

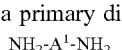
(III)

an aldehyde of formula (IV)

(IV)

and a phenol compound of formula (V)

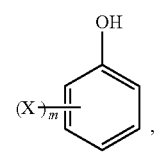
(V)

with elimination of water, and
(iii) reaction of
a primary diamine of formula (III)

$NH_2-A^1-NH_2$ (III)

an aldehyde or ketone of formula (VII)

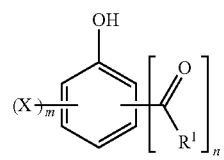
(VII)

and hydrogen,
with elimination of water.

6. The epoxy resin composition as claimed in claim 1, wherein A¹ is an alkylene radical having 2 to 15 carbon atoms and contains an aryl ring.

7. The epoxy resin composition as claimed in claim 1, wherein A¹ is 1,3-phenylenebis(methylene).

8. The epoxy resin composition as claimed in claim 1, wherein R¹ is hydrogen.

9. The epoxy resin composition as claimed in claim 1, wherein the at least one amine of formula (I) is present in an amount such that 20% to 80% of a total amine hydrogens in the hardener originate from the at least one amine of formula (I).

10. The epoxy resin composition as claimed in claim 1, wherein A² is 1,2-propylene.

11. The epoxy resin composition as claimed in claim 1, wherein the amine of formula (II) is a reaction product of the reductive alkylation of ethylene-1,2-diamine or propylene-1,2-diamine with an aldehyde or ketone of formula (VIII) and hydrogen

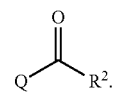
(VIII)

12. The epoxy resin composition as claimed in claim 1, wherein A² is 1,2-ethylene.

13. The epoxy resin composition as claimed in claim 1, wherein the hardener component further comprises at least one further amine that does not correspond to formulas (I) and (II) and/or at least one accelerator.

14. A cured composition obtained from curing the epoxy resin composition as claimed in claim 1.

15. A coating comprising the epoxy resin composition as described in claim 1.

16. A cured composition obtained from curing the coating as claimed in claim 15.

* * * * *